(12) United States Patent
Giannetti (10) Patent No.: US 8,810,830 B2
(45) Date of Patent: Aug. 19, 2014

(54) SYSTEM AND METHOD FOR SCHEDULING A PRINT JOB

(75) Inventor: Fabio Giannetti, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 616 days.

(21) Appl. No.: 12/892,661

(22) Filed: Sep. 28, 2010

(65) Prior Publication Data

US 2012/0075662 A1    Mar. 29, 2012

(51) Int. Cl.
*G06F 3/12* (2006.01)

(52) U.S. Cl.
CPC ............ *G06F 3/1285* (2013.01); *G06F 3/1217* (2013.01); *G06F 3/1247* (2013.01)
USPC ........................................ 358/1.15; 358/1.13

(58) Field of Classification Search
CPC ..... G06F 3/126; G06F 3/1262; G06F 3/1263; G06F 3/1211; G06F 3/1215; G06F 3/1217; G06F 3/1296; H04N 1/00954; H04N 1/0092
USPC .................................. 358/1.13–1.17; 718/102
See application file for complete search history.

(56) References Cited

U.S. PATENT DOCUMENTS

| | | | |
|---|---|---|---|
| 6,618,167 B1 | 9/2003 | Shah | |
| 7,158,244 B2 | 1/2007 | Sommer et al. | |
| 7,630,092 B1 | 12/2009 | Suzuki et al. | |
| 7,707,577 B2 | 4/2010 | Inaba | |
| 7,715,031 B2 | 5/2010 | Westervelt et al. | |
| 2006/0055974 A1 | 3/2006 | Yamaguchi | |
| 2006/0279781 A1* | 12/2006 | Kaneko | 358/1.15 |
| 2007/0058191 A1* | 3/2007 | Harigae | 358/1.15 |
| 2008/0270402 A1* | 10/2008 | Inoue et al. | 707/7 |
| 2010/0141984 A1 | 6/2010 | Horn et al. | |
| 2010/0271656 A1* | 10/2010 | Morales et al. | 358/1.15 |

FOREIGN PATENT DOCUMENTS

EP    0962854 A2    12/1999

* cited by examiner

*Primary Examiner* — Marivelisse Santiago Cordero
*Assistant Examiner* — Kent Yip (57) ABSTRACT

In one example, the system discloses a profiler which calculates a "time-to-print" a first print job and a "time-to-process" a second print job. A scheduler schedules the second print job, for printing after the first print job, if the "time-to-process" the second print job is≤the "time-to-print" the first print job. In one example, an article discloses instructions to predict a "time-to-print" a first print job, a "time-to-process" a second print job, and then schedule the second print job, for printing, if the "time-to-process" the second print job is≤the "time-to-print" the first print job. In one example, the method discloses receipt of a set of print jobs having a first printing schedule, and then re-scheduling the print jobs so as to ensure that a next print job from the set is ready for printing right after a prior print job from the set has finished printing.

20 Claims, 5 Drawing Sheets

Printing Queues 302

| Input Queue 104 | Imposition & RIP Queues 118 |
|---|---|
| Print Job "A" | Print Job "Z" |
| Print Job "B" | Print Job "B" |
| ... | ... |
| Print Job "Z" | Print Job "A" |

SYSTEM AND METHOD FOR SCHEDULING A PRINT JOB

CROSS-REFERENCE TO RELATED OR CO-PENDING APPLICATIONS

This application may relate to co-pending P.C.T. Patent Application No. PCT/US2010/047525, entitled "System And Method For Imposing A Print Job," filed on Sep. 1, 2010, by Giannetti et al. This application is commonly assigned to Hewlett-Packard Development Co. of Houston, Tex.

BACKGROUND OF THE INVENTION

Brief Background Introduction

The present invention relates generally to systems and methods for printing. When Print Service Providers (PSPs) receive a print job, a workflow for printing is created. There are many steps to this workflow, and managing them efficiently is complex. Further improvements to print job workflows are desired.

BRIEF DESCRIPTION OF THE DRAWINGS

Some examples of the invention are described in the following figures.

DETAILED DESCRIPTION

Digital Printing includes at least three steps:

Imposition: Imposition is a process of placing one or more print job pages on a single sheet of stock, along with several marks to enable cutting, folding, and stitching machines to generate a desired set of printed matter in an automated fashion;

RIP-ing: Raster Image Processing is a process of rendering print job pages or sheets into bitmapped files (one for each color separation) which can direct the operation of a printing device engine; and Printing: Printing is the process of translating the imposed and rendered bitmap file into actual ink dots on a stock sheet (usually paper).

For greater efficiency and productivity, Print Service Providers (PSPs) usually prefer keeping their printing devices operating as continuously as possible. This would be ensured if a set of imposed and rendered print jobs were already waiting in a printing device queue immediately, or very soon, after an earlier print job finishes printing. However, the imposition and rendering process can take more time than printing and thereby introduces time gaps in the printing device's operation; in such situations, the printing device remains an idle, underutilized resource.

For example, if each print job is assigned to a single set of imposition & RIP resources, then the imposition and rendering processing time can greatly vary between print jobs due to variations in certain complexity elements within the print job, resulting in a significant gap between print jobs sent to the printing device. There could also be a situation where all the print jobs require a similar RIP time, thereby not only making the printing device wait for a first print job, but also leaving the RIPs under-utilized as subsequent print jobs move through the queue.

One attempt to reduce these gaps is to process each print job with as many imposition & RIP resources as possible, using parallel processing techniques. This, however, still does not guarantee that the printing device will be continuously utilized (e.g. when the printing device is waiting for a "particularly complex" RIP to be completed by the multiple imposition & RIP resources. Thus, in neither of these two scenarios is constant operation of the printing device ensured. To maximize usage of the printing device, there is a need for scheduling print jobs for RIP-ing in such a way that they are ready for printing as soon as a previous print job finishes to print.

The present invention addresses and remedies many, if not all, of the concerns discussed above.

The present invention is better able to provide a "constant stream of imposed & rendered print jobs" to one or more printing devices, in a print production workflow, by varying when print jobs are scheduled for processing (e.g. imposing & rendering). The present invention describes a system and method for re-ordering print job processing elements to help ensure that printing devices are significantly utilized, and thereby increasing through-put of a PSP's print production workflow.

This is possible since the present invention teaches how to analyze the "time-to-process" and "time-to-print" a set of print jobs in advance, based on complexity and resource usage, and then in response re-order the sequence in which the print jobs are printed. Being able to compute a complete print production time enables the present invention to help match the "time-to-print" a current print job with the "time-to-process" a next pending print job. In general this rescheduling results in "less imposition & RIP intensive" print jobs, having multiple copies, being printed before more complex print jobs.

Thus the present invention provides techniques which help ensure that when a printing device has finished printing a current print job that a next print job will immediately be ready for printing, thereby enabling a greater number of print jobs to be printed over a given time period.

Details of the present invention are now discussed.

Figure 1:
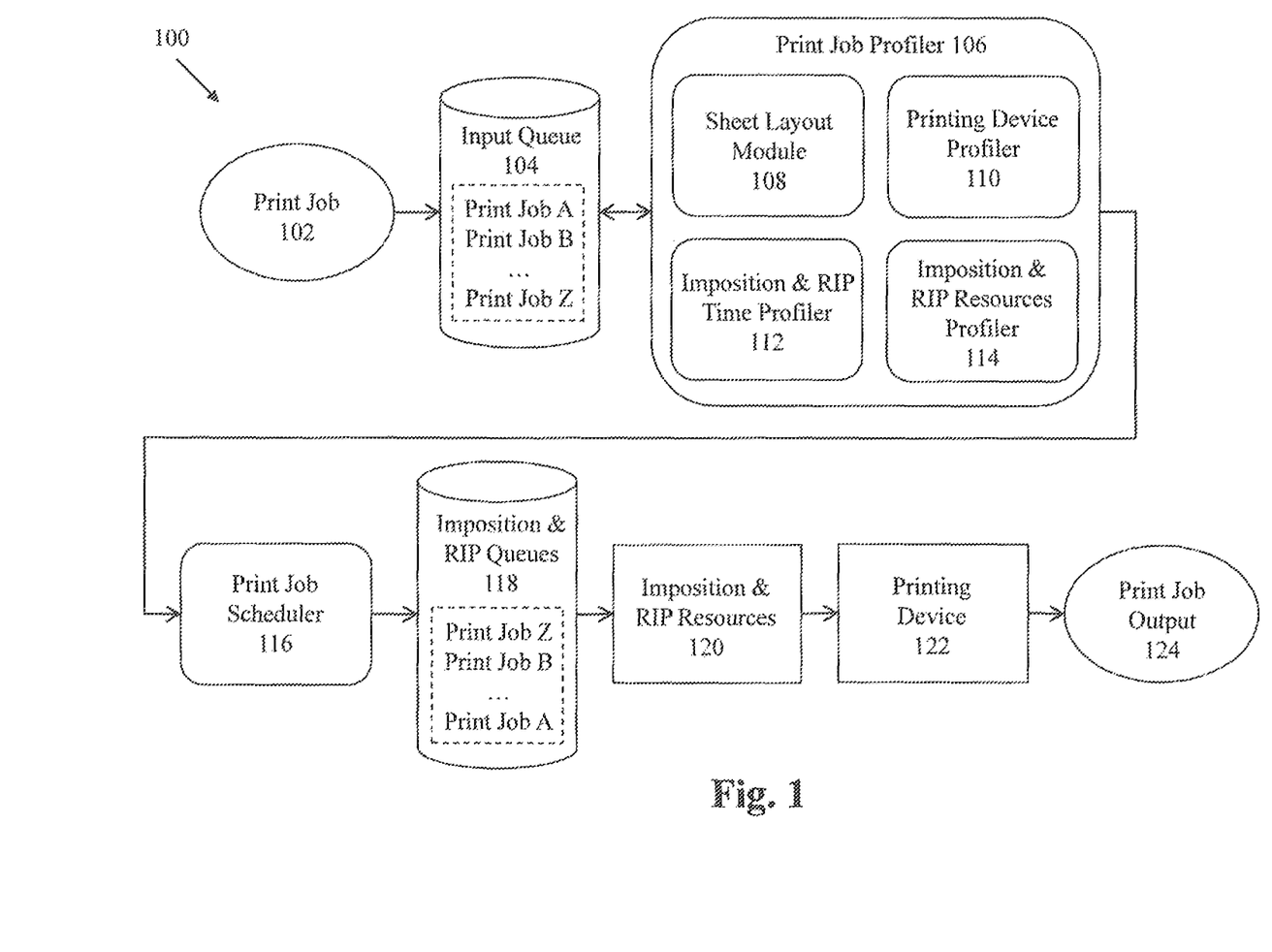
FIG. 1 is a dataflow diagram of one example of a system for scheduling a print job.
Figure 2:
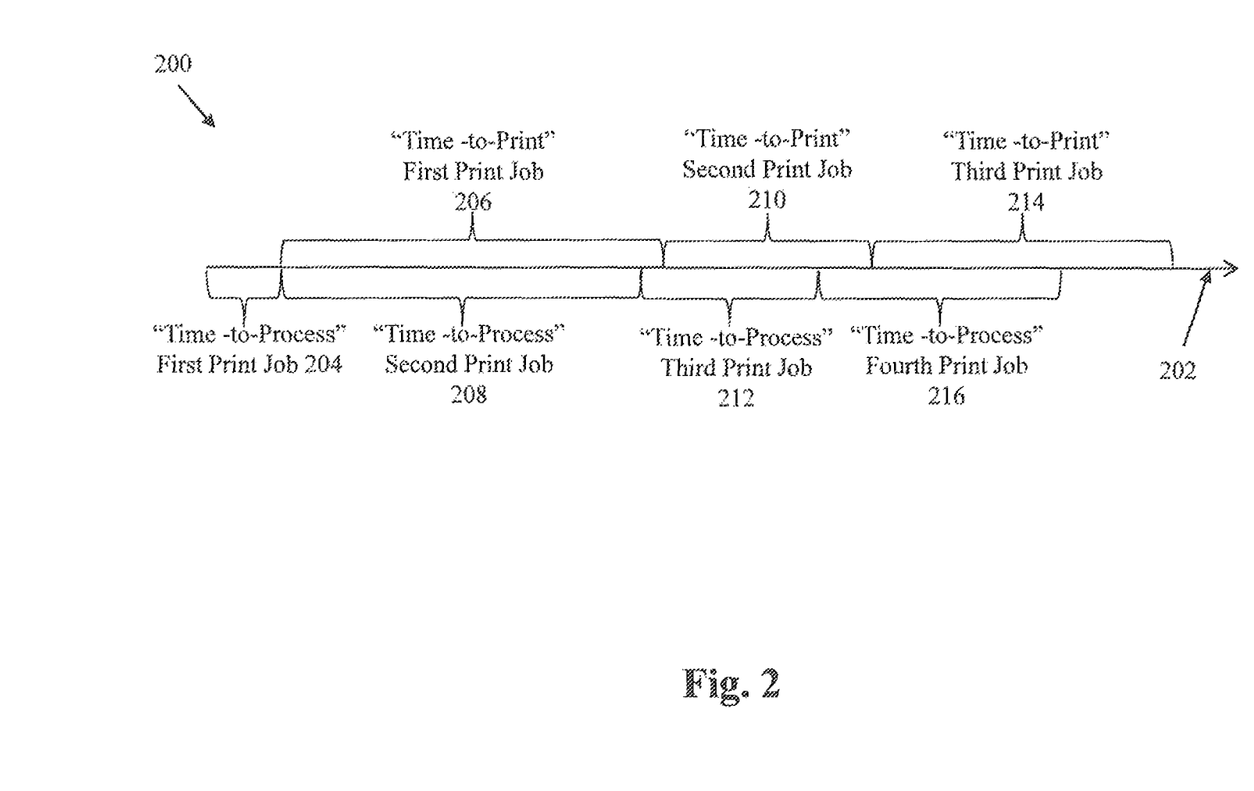
FIG. 2 is a timing diagram used by one example of the system.
Figure 3:
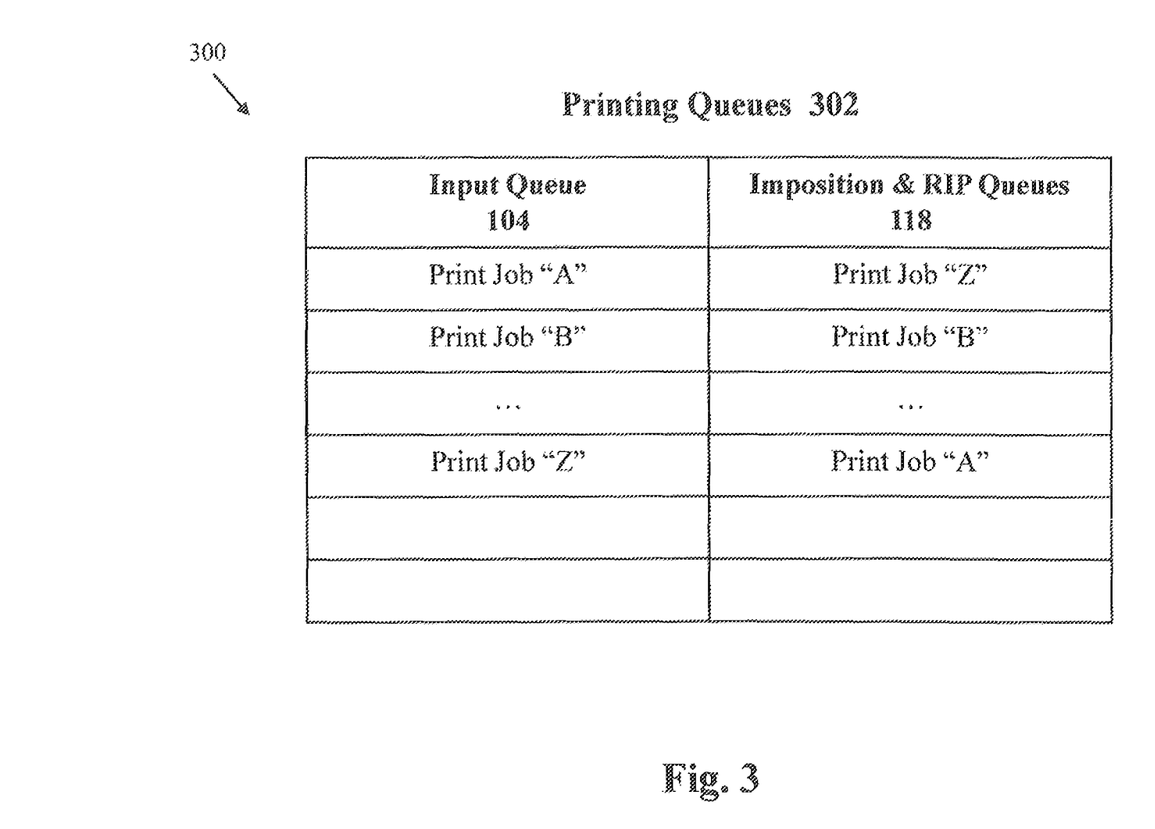
FIG. 3 is a data structure diagram used by one example of the system.

FIG. 1 is a dataflow diagram of one example of a system 100 for scheduling a print job. FIG. 2 is a timing diagram 200 used by one example of the system 100. FIG. 3 is a data structure diagram 300 used by one example of the system. Due to the integrated operation of the system 100 as depicted by the timing diagram 200 and using the data structure 300, and to facilitate a logical understanding of the present invention, FIGS. 1 through 3 are discussed together in portions of this detailed description.

In one example of the present invention, a set of print jobs 102 are loaded into an input queue 104 in a PSP's (Print Service Provider's) computer system 100. The print job 102 is defined using a Page Description Language (PDL, such as PDF or Postscript or XPS); however, other print job languages are also possible. FIGS. 1 & 3 show an example where Print Job "A", Print Job "B", on through Print Job "Z" have been received in input queue 104, perhaps from another computer, over a network, or from a cloud service provider.

A print job profiler 106 calculates a predicted "time-to-process" each print job 102 before it sent to a printing device 122, using a set of imposition & RIP resources 120. The print job profiler 106 includes a sheet layout module 108, a printing device profiler 110, an imposition & RIP time profiler 112, and an imposition & RIP resources profiler 114. The operation of these elements 108, 110, 112, and 114 are discussed in more detail below.

The print job scheduler 116 variably schedules print jobs 102 based on the predicted "time-to-process" each print job 102; The operation of the print job scheduler 116 is discussed in more detail below.

The imposition & RIP queues 116 hold a set of print jobs 102 in an order determined by the print job scheduler 116 (discussed below). FIG. 3 shows an example where the print job scheduler 116 has selected Print Job "Z" for printing first, Print Job "B" for printing second, on through Print Job "A" which is to be printed last.

The imposition & RIP resources 120 are herein flexibly defined as hardware and/or software which impose and render the print job 102, and includes one or more PDL computer processors and/or PDL processing engines.

Imposition is a print processing step whereby a set of print job pages, are arranged onto a single larger sheet having a physical sheet size which is compatible with a printing device 122 that actually prints media onto the sheet. For instance, if a 20 page PDF file is to be printed on a printing device that works with sheets 4 times as large as the PDF file's page size, then imposition will arrange 4 PDF file pages onto each of the printing device's sheet, resulting in 5 sheets. Note that "printing devices" are herein defined to include both sheet and roll fed presses, web-presses, print engines, and other printing systems, apparatus, and methods.

RIP-ing is print job processing step using a Raster Image Processor (RIP) which transforms an input file (e.g. a .pdf file) into a color separated bitmap image that can be physically printed on a printer, and can in whole or in part be implemented using either hardware or software.

The imposition & RIP resources 120 can be variably programmed to perform either pre-RIP imposition, in-RIP imposition, or post-RIP imposition on all or various portions of each print job 102 in the input queue 104. Pre-RIP, in-RIP, and post-RIP imposition each have certain benefits and drawbacks.

For example, pre-RIP imposition has the advantage of manipulating relatively smaller sized PDL files, since such PDL files do not contain rendered (i.e. RIP-ed) data. Also, the resulting imposed PDL file's size is usually in proportion with the size of the original PDL file. Pre-RIP imposition is also far more efficient if the print job 102 does not have a high degree (i.e. above a predetermined threshold) of complexity, transparency, or object re-use, since it is easier and faster to assemble pre-rendered PDL pages than very large voluminous bitmaps in rendered (i.e. RIP-ed) pages. The terms complexity, transparency, and the phrase "object re-use" are presented in more detail elsewhere in this specification.

There are also some drawbacks to pre-RIP imposition. Pre-RIP imposition can remove some of the benefits of page-per-page in-RIP-ing or post-RIP-ing, like re-use and load balancing. The reason is that once the pages are imposed to a sheet, the entire, now larger, sheet needs to be RIP-ed and this slows down the RIP-ing process due to the larger sheet's size and the loss of potential object reuse. Thus, if a print job 102 is imposed before being RIP-ed, the re-use of images/object/pictures/etc. within the print job 102 is severely impacted. This is usually because imposition is done on a "per-recipient" bases, where the re-use is on a "per-page" base. For instance, it is faster to RIP 100 times the same page which has a large amount of re-use, than to RIP 20 sheets each having 5 different (i.e. un-reusable) pages. The re-use factor in the first case is 99 (1 is the first RIP) and in the second only a mere 19.

The efficiency of the RIP resources 120 diminishes, however, if pre-RIP imposition has been performed, since RIP-ing entire sheets that have already been imposed is not as parallelizable as partitioning individual print job 102 pages among several sets of RIP resources.

In-RIP, and post-RIP imposition is often more efficient when a print job 102 contains a larger number/size/area of images (e.g. objects) that can be re-used multiple times (e.g. such as background images) and/or the print job 102 includes a number of transparency computations.

One potential drawback to in-RIP imposition is a need to create an output raster buffer that is typically the same size as the print job output 124 media. As each print job 102 PDL page is rendered, each rendered page raster is placed in the output raster buffer at a location and position specified by the imposition rules. Thus enough memory needs to be allocated to both contain the output raster buffer (depending on the RIPs implementation and memory model), and for one or more of the PDL page's rasters.

A potential drawback to post-RIP imposition includes, having to perform imposition on fully rasterized color separated bitmap files which are very large and which also increase the I/O time required to transfer the rasterized job between various networked components within the system 100. Also since these bitmap files are color separated, imposition usually needs to be performed at least four times (one for each of the CMYK color separations) for each print job 102 page. Thus post-RIP imposition of the rendered (i.e. RIP-ed) color separated bitmap files can be more time consuming.

The printing device 122 generates a set of print job output 124 after imposition and rendering of the print job 102 by the imposition & RIP resources 120. The print job output 124 in some cases undergoes additional processing such as when the printed sheets are subsequently sub-divided, cut, and perhaps folded. The printing device 122 has a set of performance capabilities (e.g. printing speed in sheets/minute), which can be learned by or programmed into the printing device profiler 110.

The operation of the sheet layout module 108, printing device profiler 110, imposition & RIP time profiler 112, and imposition & RIP resources profiler 114 within the print job profiler 106 are now discussed in detail.

The sheet layout module 108 in the print job profiler 106 generates an imposed sheet layout for each of the print jobs 102 so as to calculate a number of imposed sheets to be printed for each of the print jobs 102.

The printing device profiler 110 in the print job profiler 106 collects the following information: "printing device 122 performance information (e.g. printing speed in sheets/minute)" from the printing device 122; information on "the number of copies of each print job 102 to be printed" from print job 102 metadata; and information on "the number of sheets to be printed for each of the print jobs 102" from the sheet layout module 108.

The printing device profiler 110 then calculates a predicted "time-to-print" each of the print jobs 102 based on the printing device 122 performance information, the number of print job 102 sheets, and the number of print job 102 copies to be printed. In one example, the predicted "time-to-print" is calculated as follows:

"time-to-print"=number of print job sheets*number of copies*printing device seconds per sheet Thus if there are "5" copies of a print job 102 having "3" imposed sheets to be printed on a 100 page/minute printing device, then the "time-to-print" that print job 102 will be "9" seconds.

The imposition & RIP time profiler 112 in the print job profiler 106 scans the set of print jobs 102 for a set of complexity elements. The complexity elements are objects in a print job 102 that require special processing, such as a total number of pages; a number of pages containing transparencies; re-use of images/objects/photos/etc., such as background images or graphics that are used on every page or portion thereof; page ranges requiring differing specific impositions (e.g. brochure, post card, ordinary document, etc.); the print job's 102 file size (e.g. kB, MB, etc.); the image resolution of print job 102 images/objects/photos/etc.; whether copyrighted/external/high-resolution/etc. images are included; any "trapping" or "sharpening" requirements; and so on. "Objects" are herein defined to include any part, photo, text, paragraph, page, or combination thereof a print job 102; In .pdf files, objects are often called "x-objects".

The complexity elements include: a total of the object areas to be imposed and RIP-ed; an amount of object re-use; and object transparency (e.g. the amount of overlap).

The total object areas to be imposed and RIP-ed extends beyond the view-port through which a sub-set of the objects are printed. A "view-port" is defined as that part of print job 102 page which appears on the print job output page (e.g. 8×11 paper). However, the "viewport" is often a "cropped" version of a set of full size picture and other objects embedded in a print job 102 file. Since the full size objects are often processed regardless of final view-port cropping, their total area affects the "time-to-impose" and "time-to-RIP".

Object re-use refers to objects which appear multiple times in the print job 102. Each re-used object is embedded once in the processed print job 102, and then tags are used to identify placement of subsequent instances of the re-used object in the print job.

Object transparency refers to an imaging technique for overlapping objects to create a blended coloring/grayscale effect as displayed by the print job output 124. In contrast, "opaque/non-transparent objects" require no blending, and instead the RIP just creates a "group object" that combines multiple opaque objects and discards one of the overlapped object areas. Object transparency is often expressed as a percentage (e.g. 60%), and RIP-ing transparent areas often takes significantly more processing time.

The imposition & RIP time profiler 112 then uses the set of identified complexity elements to predict both a "time-to-impose" and a "time-to-RIP" each of the print jobs 102 using either pre-RIP, in-RIP, or post-RIP imposition. In other words, the imposition & RIP time profiler 112 calculates a "time-to-impose" and a "time-to-RIP" for the following print job 102 processing scenarios: pre-RIP imposition followed by RIP-ing; in-RIP imposition while RIP-ing; and RIP-ing followed by a post-RIP imposition.

To predict the "time-to-impose", the imposition & RIP time profiler 112 multiplies each complexity element by a fixed "computational cost" which has been pre-determined based on the performance characteristics of the imposition resources 120. In one example the predicted "time-to-impose" is calculated as follows: first, aggregate and weight the complexity elements for each print job 102 into a signature, then:

"time-to-impose"=(number of print job pages/signature size)*computational cost in seconds/a number of imposition resources The complexity of the signature is linked proportionally to a number of pages per sheet (called "n-up") and the distance of pages in the signature itself. Thus, the "time-to-impose" is shorter if imposition follows a page reading order such as 1, 2, ..., n rather than a tri-fold page reading order such as n, n-1 n-2, 1, 2, 3 and so on.

The imposition & RIP time profiler 112 calculates a predicted "time-to-RIP" each of the print jobs 102 based on: either pre-RIP, in-RIP, or post-RIP imposition; the complexity elements; and the performance characteristics of the RIP resources 120. In one example the predicted "time-to-RIP" is calculated as follows:

"time-to-RIP"=SUM (print job complexity element*weight in seconds)/a number of RIP resources, wherein each complexity element has an associated "time weighting" in seconds. SUM is a summation of all complexity elements on each print job 102 page.

The imposition & RIP resources profiler 114 in the print job profiler 106 identifies the performance capabilities and availability of the set of imposition & RIP resources 120. Availability refers to whether one or more of the imposition & RIP resources 120 are currently processing some portion of a print job 102 or whether the resources 120 are idle, such as by looking at a % CPU utilization, or buffering status. This status can be obtained using queries sent to the resources 120, or by other system 100 monitoring techniques. The frequency at which the imposition & RIP resources profiler 114 identifies the status of the imposition & RIP resources 120 can vary with each instantiation of the present invention.

The operation of the print job scheduler 116 is now discussed in more detail.

Using the "time-to-impose", "tune-to-RIP", and "time-to-print" predictions for each of the print jobs 102, as well as the variable capabilities and availability of each of the imposition & RIP resources 120, the print job scheduler 116 re-orders (i.e. selectively shuffles) the print jobs 102 so as to ensure that a next print job 102 is ready for printing right after the printing device 122 is finished printing a prior print job 102.

In one example embodiment of the present invention, the print job scheduler 116 selects a "first" print job 102 according to the following equation:

MAX ("time-to-print"−"time-to-process"), wherein "MAX" means "Maximum" and the "first" print job 102 is selected as that print job having a largest difference between the print job's "time-to-print" and "time-to-process". This helps minimize a start-up time to print the first job, and provide ample "time-to-process" a next print job.

The "time-to-process" includes the "time-to-impose" and the "time-to-RIP" the print job. In other embodiments, however, the "time-to-process" may also include other print job processing or finishing steps.

In another example embodiment of the present invention, the print job scheduler 116 selects the "first" print job 102 according to the following equation:

"time-to-print">>"time-to-process", wherein ">>" means "much greater than".

The print job scheduler 116 then selects a "next" print job 102 for printing according to the following equation:

"time-to-print" the first print job≥"time-to-process" the next print job

To help ensure that at least one of the print jobs 102 satisfies the above equation, the print job scheduler 116 can reduce the "time-to-process" the "next print job" by selecting either pre-RIP, in-RIP, or post-RIP imposition, as well as by selecting a set of imposition & RIP resources 120 having a desired performance capabilities and availability. Thus the print job scheduler 116 can partially control, the "time-to-process" the print jobs 102.

This selection/re-ordering process continues until all of the print jobs 102 in the input queue 104 are re-ordered in the imposition & RIP queues 118 so that the printing device 122 is operating continuously, or nearly so. In general, the print jobs 102 that are the quickest to impose & RIP, and have the most copies to be printed, are placed first in the imposition & RIP queues 118, and thus sent to the printing device 122 first. This allow as much time as possible to print at a later time those other print jobs that are slower to impose & RIP, and/or have fewer copies to be printed.

Now discussed is one example print job scheduler 116 scheduling strategy in the context of FIGS. 2 and 3. In this example, the print job scheduler 116 accesses the "time-to-impose", "time-to-RIP", and "time-to-print" data predicted by the print job profiler 106 for each of the print jobs 102 in the input queue 104 (e.g. Print Job "A", Print Job "B" through Print Job "Z").

The print job scheduler 116 identifies a first print job from the set of print jobs 102 which would enable the printing device 122 to begin printing as quickly as possible (e.g. having a shortest "time-to-process" the first print job 204, as shown in FIG. 2). The print job scheduler 116 also accesses the imposition & RIP resource 120 capabilities and availability provided by the print job profiler 106, and identifies a set of imposition & RIP resources 120 which would further minimize the "time-to-process" the first print job 204. As part of this selection process, the print job scheduler 116 will select either pre-RIP, in-RIP, or post-RIP imposition for the first print job. During the "time-to-process" the first print job 204, the printing device 122 is either warming-up or idle.

If a set of print jobs 102 have very similar times-to-process, the print job scheduler 116 picks as the first print job, the print job having a longest "time-to-print"; for some print jobs, the "time-to-print" can actually be quite long (e.g. on the order of hours in some cases, depending upon a number of "copies" that need to be printed). In the example shown in FIGS. 2 & 3, the print job scheduler 116 has selected Print Job "Z" as the first print job.

Similarly, the print job scheduler 116 identifies a second print job from the remaining set of print jobs 102 which would enable the printing device 122 to continue printing just as soon as the "time-to-print" first print job 206 elapsed. In the example shown in FIGS. 2 & 3, the print job scheduler 116 has selected Print Job "B" as the second print job. Print Job "B" has a "time-to-process" the second print job 208 which is less than or equal to the "time-to-print" first print job 206. This is true even though the "time-to-process" the second print job 208 is much longer than the "time-to-process" the first print job 204. The longer "time-to-process" the second print job 208 could be due to Print Job "B" having a greater number of complexity elements than Print Job "Z" did.

The print job scheduler 116 identifies a third and fourth print job from the set of print jobs 102. In FIG. 2, the "time-to-process" the third print job 212 begins even before the "time-to-print" first print job 206 has ended, although this early processing start may not always be required. Similarly, the "time-to-process" the fourth print job 216 begins before the "time-to-print" second print job 210 ends. The printing device 122, however, is constantly printing since the "time-to-print" second print job 210 begins right after the "time-to-print" first print job 206 ends, and the "time-to-print" third print job 214 begins right after the "time-to-print" second print job 210 ends.

This scheduling process then repeats until all remaining print jobs 102 are printed.

Note that due to these variations in the "time-to-process" the print jobs 102, Print Job "A", which was received by the input queue 104 first, has as shown in FIG. 3 been placed last in the imposition & RIP queues 118. Thus, print jobs which have many complexity elements and require a great deal of imposition & RIP resources 120, like Print Job "A", can still be scheduled in the imposition & RIP queues 118 so as not to hold back the operation of the printing device 122.

Figure 4:
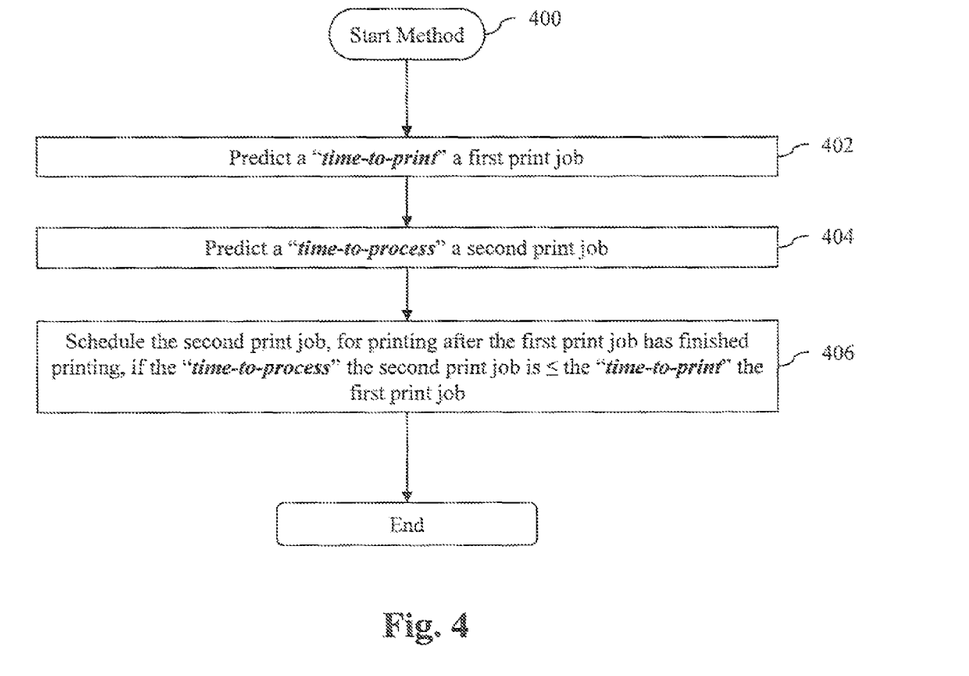
FIG. 4 is a flowchart of one example of a method for scheduling a print job.

FIG. 4 is a flowchart of one example of a method 400 for scheduling a print job. Those skilled in the art will recognize that while one example of the present invention's method is now discussed, the material in this specification can be combined in a variety of ways to yield other examples as well. The method next discussed is to be understood within a context provided by this and other portions of this detailed description.

The method 400 begins in block 402 where the print job profiler 106 predicts a "time-to-print" a first print job from the print jobs 102 in the input queue 104. Next, in block 404, the print job profiler 106 predicts a "time-to-process" a second print job from the print jobs 102 in the input queue 104. Then in block 406 the print job scheduler 116 schedules the second print job, for printing by the printing device 122 after the first print job has finished printing, if the "time-to-process" the second print job is ≤ (i.e. less than or equal to) the "time-to-print" the first print job. In this way, the second print job will be ready for printing just as soon as the first print job has finished printing.

Figure 5:
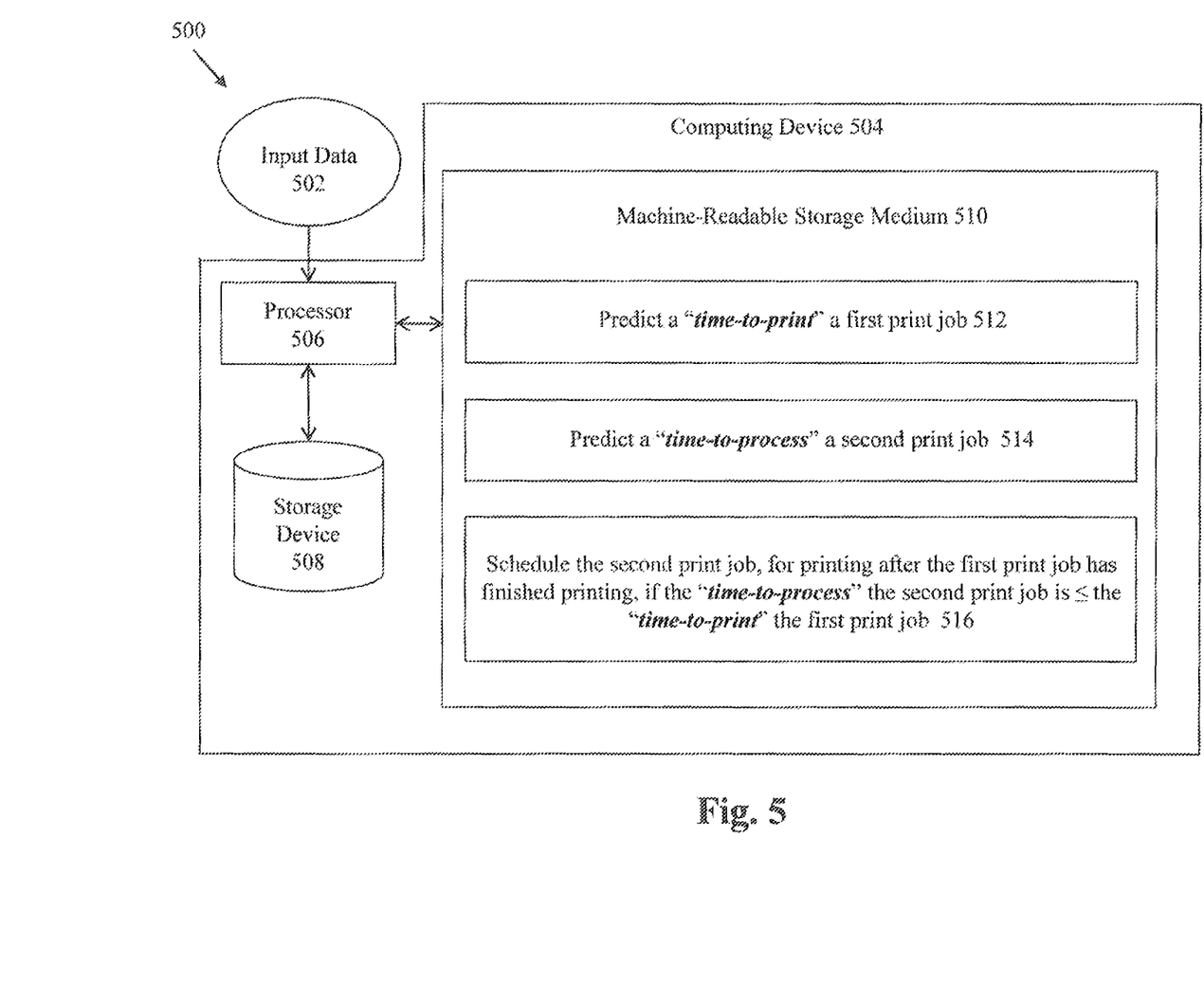
FIG. 5 is a dataflow diagram used by another example of the system.

FIG. 5 is a dataflow diagram 500 used by another example of the system 100. The diagram 500 shows input data 502 being received by a computing device 504. The computing device 504 includes a processor 506, a storage device 508, and a machine-readable storage medium 510. Instructions within the machine-readable storage medium 510 control how the processor 506 interprets and transforms the input data 502, using data within the storage device 508.

The instructions stored in the machine-readable storage medium 510 include: predicting a "time-to-print" a first print job 512, predicting a "time-to-process" a second print job 514, and scheduling the second print job, for printing after the first print job has finished printing, if the "time-to-process" the second print job is ≤ the "time-to-print" the first print job 516.

Other electronic apparatuses can effect the present invention as well. Such an electronic apparatus could include: a processor device, a bus, a storage device, and algorithms.

The processor device includes a processor (such as a central processing unit, CPU, microprocessor, application-specific integrated circuit (ASIC), etc.) for controlling the overall operation of the storage device 308 (such as random access memory (RAM) for temporary data storage, read only memory (ROM) for permanent data storage, firmware, flash memory, external and internal hard-disk drives, and the like).

The processor device communicates with the storage device and algorithms using the bus and performs operations and tasks that implement one or more blocks of the flow diagrams discussed herein. The storage device, for example, stores applications, data, programs, algorithms (including software to implement or assist in implementing examples in accordance with the present invention) and other data.

As used herein and in the claims, the following words are defined as follows:

The term "cloud" is a computer network accessible over the internet and/or web that is dynamically scalable with virtualized resources, such as printing resources. Users are not required to have knowledge or expertise in the infrastructure of the cloud that relies on the internet to satisfy the computing or printing needs of users. The cloud provides computer and/or printing device services with business applications that are accessible from a web browser while software and data are stored on servers in the cloud. For example, a printing cloud system supports infrastructure for printing device services, platform for the printing device services, and software for the printing device services.

The term "printing device" is an electronic device that performs one or more functions of printing, scanning, and copying. In one example, a printing device is a printer. A printing device, however, is not limited to printers, but includes other devices, such as a scanner, a copier, a machine with facsimile operations, and/or a multi-functional device that performs two or more functions of printing, scanning, copying, and faxing.

The term "print/copy/scan" is print and/or copy and/or scan.

The term "web-enabled" printing device is a printing device that is accessed to print/copy/scan documents over the web.

The term "world wide web" or "web" is a system of linked hypertext documents access through the internet. Using a web browser, a user can view web pages that include text, images, video, and other media and navigate between these pages with hyperlinks.

The term "printer" is not limited to just standard printers, but includes various other types of electronic devices that perform one or more functions such as printing, scanning, or copying.

The terms "job", "file" or "a set of jobs" refers to any collection of files, such as a directory of files. A "file" can refer to any data object (e.g., a document, a bitmap, an image, an audio clip, a video clip, software source code, software executable code, etc.). A "file" can also refer to a directory (a structure that contains other files).

Functional and software instructions described above are typically embodied as a set of executable instructions which are effected on a computer which is programmed with and controlled by said executable instructions. Such instructions are loaded for execution on a processor (such as one or more CPUs). The processor includes microprocessors, microcontrollers, processor modules or subsystems (including one or more microprocessors or microcontrollers), or other control or computing devices. A "processor" can refer to a single component or to plural components.

In one example, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

In some examples, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of examples, those skilled in the art will appreciate numerous modifications and variations thereof. It is intended that the following claims cover such modifications and variations as fall within the true spirit and scope of the invention.

What is claimed is:

1. A system for scheduling a print job for printing, comprising:
    computing hardware including a processor and memory;
    a print job profiler implemented by the computing hardware and which calculates a "time-to-print" a first print job and a "time-to-process" a second print job, the "time-to-print" including a time for actually printing the first print job after the first print job has been processed, and the "time-to-process" including a time for processing the second print job prior to the second print job being printed; and
    a print job scheduler implemented by the computing hardware and which schedules the second print job, for printing after the first print job, if the "time-to-process" the second print job is less than or equal to the "time-to-print" the first print job, after comparing the "time-to-process" the second print job to the "time-to-print" the first print job.

2. The system of claim 1:
    further comprising an input queue having a set of print jobs;
    wherein the print job profiler calculates a "time-to-process" each of the set of print jobs; and
    wherein the print job scheduler selects the second print job from a sub-set of the print jobs having a "time-to-process" that is less than or equal to the "time-to-print" the first print job.

3. The system of claim 2:
    wherein the print job profiler calculates a "time-to-print" each of the sub-set of print jobs; and
    wherein the second print job has a longer "time-to-print" than at least one print job in the sub-set of the print jobs.

4. The system of claim 1:
    further comprising an input queue having a set of print jobs; and
    wherein the print job scheduler selects as "the first print job" a print job from the set of print jobs having a shorter "time-to-process" than at least one other print job in the set of print jobs.

5. The system of claim 1:
    further comprising an input queue having a set of print jobs; and
    wherein the print job scheduler selects as "the first print job" a print job from the set of print jobs having a longer "time-to-print" than at least one other print job in the set of print jobs.

6. The system of claim 1:
further comprising an input queue having a set of print jobs, including the first and second print jobs; and
wherein the print job scheduler schedules a third print job from the set of print jobs, for printing after the second print job, having a "time-to-process" that is less than or equal to the "time-to-print" the second print job.

7. The system of claim 1:
further comprising a set of imposition & RIP resources which impose and RIP the second print job; and
wherein the print job scheduler affects the "time-to-process" the second print job by commanding the imposition & RIP resources to perform one from a group including: pre-RIP imposition, in-RIP imposition, and post-RIP imposition.

8. The system of claim 1:
further comprising a set of imposition & RIP resources which impose and RIP the second print job; and
wherein the print job scheduler affects the "time-to-process" the second print job by selecting a sub-set of the imposition & RIP resources having a predetermined performance capability and availability.

9. The system of claim 1:
wherein the print job profiler "time-to-process" calculation includes a "time-to-impose" and "time-to-RIP" calculation.

10. The system of claim 1:
further comprising a printing device, having a sheets printed per minute speed; and wherein the print job profiler "time-to-print" calculation includes the printing speed of the printing device.

11. The system of claim 1, wherein a plurality of print jobs includes the first print job, a second print job, and a plurality of other print jobs,
wherein the print job scheduler schedules a selected print job of the other print jobs to be printed before the first print job and the second print job are printed,
wherein the print job scheduler selects the selected print job as the other print job that has a maximum difference between a time-to-print thereof and a time-to-process thereof.

12. An article comprising at least one non-transitory computer-readable storage medium storing instructions that upon execution cause a computer system to:
predict a "time-to-print" a first print job, wherein the "time-to-print" including a time for actually printing the first print job after the first print job has been processed;
predict a "time-to-process" a second print job, wherein the "time-to-process" including a time for processing the second print job prior to the second print job being printed; and
schedule the second print job, for printing after the first print job, if the "time-to-process" the second print job is less than the "time-to-print" the first print job, after comparing the "time- to-process" the second print job to the "time-to-print" the first print job.

13. The instructions of claim 12, wherein predict a "time-to-print" includes:
calculating the "time-to-print" based on a printing speed of a printing device, a number of the first print job sheets to be printed, and a number of the first print job copies to be printed.

14. The instructions of claim 13, wherein predict a "time-to-print" includes:
calculating the "time-to-print" as follows: "time-to-print"=number of print job sheets * number of copies * printing device seconds per sheet.

15. The instructions of claim 12, wherein predict a "time-to-process" includes:
calculating the "time-to-process" based on at least one complexity element from a group including: a total of the object areas to be imposed and RIP-ed; an amount of object, image, or photo re-use; a number of object transparencies; a total number of pages; page ranges requiring differing specific impositions; the print job's file size; the image resolution of images, objects, or photos in the print job; whether copyrighted, external, or high-resolution images are included; trapping requirements in the print job; and sharpening requirements in the print job.

16. The instructions of claim 12, wherein predict a "time-to-process" includes:
identifying a set of complexity elements in the second print job; and
calculating a "time-to-impose" the second print job, by multiplying each of the complexity elements by a fixed computational cost based on performance characteristics of a set of imposition resources.

17. The instructions of claim 12, wherein predict a "time-to-process" includes:
identifying a set of complexity elements in the second print job; and
calculating a "time-to-RIP" the second print job as: "time-to-RIP"=SUM (print job complexity element * weight)/a number of RIP resources.

18. A method, effected by a computer programmed with executable instructions, for scheduling a print job, comprising:
receiving a set of print jobs in an input queue having a first printing schedule; and
re-scheduling the print jobs so as to ensure that a next print job from the set is ready for printing right after a prior print job from the set has finished printing;
calculating a "time-to-process" and "time-to-print" each of the set of print jobs; and
re-scheduling the print jobs such that a "time-to-process" the next print job is less than or equal to a "time-to-print" the prior print job, after comparing the "time-to-process" the next print job to the "time-to-print" the prior print job, the "time-to-print" including a time for actually printing the prior print job after the prior print job has been processed, and the "time-to-process" including a time for processing the next print job prior to the next print job being printed.

19. The method of claim 18:
wherein re-scheduling includes scheduling a print job having a longer "time-to-print" before print jobs having a shorter "time-to-print".

20. The method of claim 18:
wherein calculating a "time-to-print" includes determining a printing device speed, a number of print job copies to print, and a number of sheets per print job copy.

* * * * *

UNITED STATES PATENT AND TRADEMARK OFFICE
CERTIFICATE OF CORRECTION

PATENT NO. : 8,810,830 B2
APPLICATION NO. : 12/892661
DATED : August 19, 2014
INVENTOR(S) : Fabio Giannetti It is certified that error appears in the above-identified patent and that said Letters Patent is hereby corrected as shown below:

In the Claims

In column 10, line 35, in Claim 1, delete "process"the" and insert -- process" the --, therefor.

In column 11, line 49, in Claim 12, delete "process"including" and insert -- process" including --, therefor.

In column 11, line 56, in Claim 12, delete "print"the and insert -- print" the --, therefor.

Signed and Sealed this
Twenty-third Day of December, 2014

Michelle K. Lee
*Deputy Director of the United States Patent and Trademark Office*